(No Model.)
F. DUBERO & P. MOHRDIECK.
ELECTRIC BATTERY.
No. 521,260. Patented June 12, 1894.
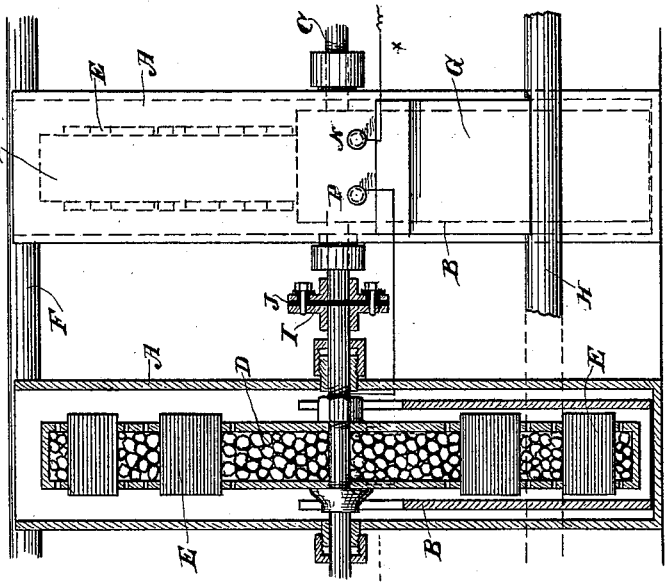
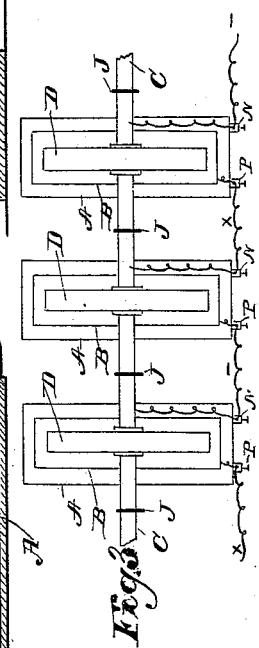
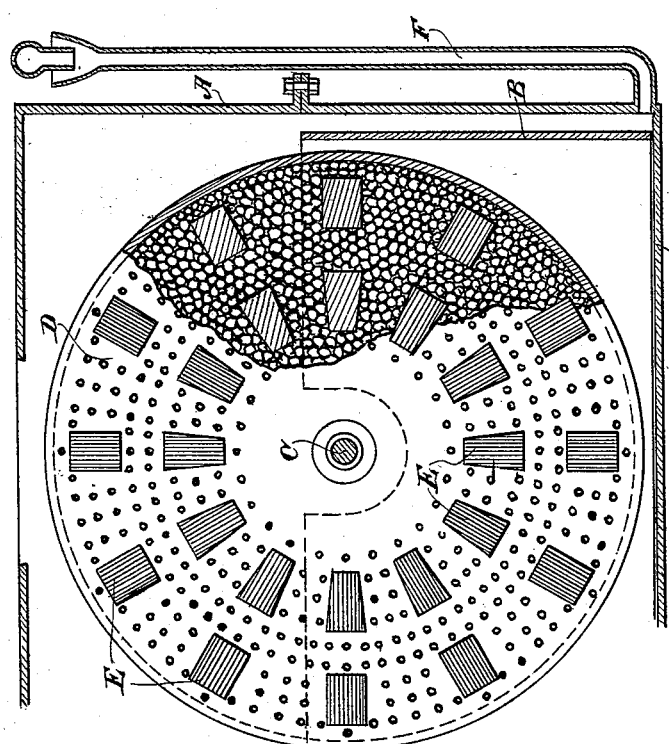

UNITED STATES PATENT OFFICE.

FRED. DUBERO AND PETER MOHRDIECK, OF SAN FRANCISCO, CALIFORNIA.

ELECTRIC BATTERY.

SPECIFICATION forming part of Letters Patent No. 521,260, dated June 12, 1894.

Application filed January 15, 1894. Serial No. 496,965. (No model.)

*To all whom it may concern:*

Be it known that we, FRED. DUBERO and PETER MOHRDIECK, citizens of the United States, residing in the city and county of San Francisco, State of California, have invented an Improvement in Electrical Batteries; and we hereby declare the following to be a full, clear, and exact description of the same.

Our invention relates to an improvement in batteries for generating electricity, and in means for operating the same.

It consists in certain details of construction which will be more fully explained by reference to the accompanying drawings, in which—

Figure 1 is a longitudinal section through the battery showing one form of applying our invention. Fig. 2 is a view of a series of our batteries, one of them being shown in cross section. Fig. 3 is a diagrammatic view of the batteries and their connections.

The object of our invention is to provide a continuous or constant battery, the elements of which are renewed during the operation of the battery, and in the employment in conjunction with said battery of sea water as the active energizing elements of said battery.

In the construction of our battery, we employ any suitable or desirable substance which will form the positive and negative elements of the battery, these being well known to those conversant with such matters. These elements are so arranged with relation to each other that the negative element may be alternately submerged in the active solution in which the positive element remains submerged, and then withdrawn therefrom and exposed to the air to become dry and to absorb a certain portion of air before it is again submerged. This operation may be carried out in various ways. We have found a very suitable method is to make the negative element in the form of a rotary hollow cylinder.

In this construction, A is an outer case which may be made of any suitable or desirable material, and may, if desired, form a part of the negative element of the battery. Within this case is placed the positive element or plate B. In the present case it is shown in the form of a hollow rectangle which fits within the outer case and is maintained out of contact therewith either by insulating supports at the bottom or similar insulating suspending devices from above.

C is a shaft extending across the outer case and turning in suitable bearings therein having stuffing-boxes to prevent leakage at the point where the shaft enters the case. Upon this shaft is fixed a circular revolving hollow cylinder D. In the present case, this hollow cylinder consists of two sides separated from each other and having a surrounding rim forming an inclosure within which is placed a filling of manganese or other suitable or desired material, in coarse particles about the size of peas. The sides of the hollow cylinder are perforated with small holes so as to admit the solution or liquor of the battery to enter freely into that portion which is submerged, and from which it can escape as the portion of the hollow cylinder emerges from the liquid. Openings are made transversely through the sides of the hollow cylinder and through these openings are introduced the carbon blocks E which extend through from side to side and project a little on each side of the disk. The hollow cylinder is rotated by any suitable power applied thereto so that it is turned very slowly.

By experiment, we have found that sea water forms a most economical and valuable exciting liquid for this apparatus, which has been designed especially for use upon sea-coast and upon ship-board where it is intended to generate power for any purposes for which it is desired to use it. In order to economically use sea water and to constantly renew it as is necessary, we have shown an inlet pipe or passage F through which the water is delivered into the interior of the outer case A near the bottom. This outer case extends up so high as to nearly or entirely inclose the rotary hollow cylinder, and the supply pipe extends up to a point near the top of the disk. Upon the opposite side of the case, at a point below the line of the shaft, is a discharge pipe or passage G through which the liquid is constantly flowing out and discharging through a suitable discharge pipe H. By this arrangement we are enabled to supply fresh exciting liquid constantly to the battery and renew it continuously. The hollow cylinder being rotated, as previously described at a very slow rate, a portion of it will always be submerged in the liquid and another portion will be constantly exposed to the air where it and the contents will be partially dried and will absorb a certain amount of oxygen from the atmosphere which remains therein when it is again plunged beneath the surface of the exciting liquid. In order to couple the batteries of this sort together the shafts C, of any number of these batteries, may be united by couplings, as shown at I, it being necessary when uniting these batteries in series to introduce a non-conducting plate of hard rubber or other substance J into the couplings so as to prevent actual contact of the shaft sections. The outer case and the hollow cylinder which form a negative element of each section of a coupled battery will be connected with the positive element of the next succeeding battery, and so on to any extent which may be desired, by the usual couplings.

The connection with the positive element of the battery is made by means of a binding screw P having a metallic rod or wire extending through it to form contact between the elements B and the conductor fixed to the binding post. The connection with the negative element is made through the shaft C upon which the cylinder is mounted by means of a binding screw N fixed to the casing, with a similar wire connecting it with the shaft, and through it with the negative element.

Having thus described our invention, what we claim as new, and desire to secure by Letters Patent, is—

1. In a sea water battery consisting of a containing tank, an interior positive element suspended within said tank having a binding post or connection for the positive wire, a negative element consisting of a revoluble hollow cylinder with a filling or negative material and perforations through which the exciting liquid may reach the material when submerged and be drained from it when raised out, and a binding post for the negative electrode forming connection through the shaft of the apparatus.

2. In a battery, an exterior tank for containing an exciting liquid, a positive electrical element of the battery submerged therein, a shaft extending across the containing tank and turning in journal-boxes thereon, and a cylinder composed of perforated sides and rim, and adapted to contain a pulverized element which acts as a negative in the battery, substantially as herein described.

3. In a battery, an exterior containing tank for the exciting liquid, a positive element of the battery consisting of a rectangular plate supported within the tank and insulated from the negative element of the battery, a shaft journaled across the tank and rotatable thereon, a cylinder composed of perforated sides and rim secured to said shaft, openings made through the sides of said cylinder and carbon blocks fixed in said openings within the ends projecting upon each side of the cylinder, so that the constant rotation of the cylinder alternately submerges and removes the periphery of the same and the carbon blocks from the exciting liquid, substantially as herein described.

4. A battery consisting of an exterior containing tank, a positive element suspended therein and insulated therefrom, a negative element consisting of a hollow cylinder with perforated sides journaled and revoluble within the containing tank and having a filling of negative material, a supply pipe through which the sea water or exciting liquid is introduced near the bottom of the containing tank, and a discharge pipe having an opening below the level of the supply whereby a constant circulation is maintained.

In witness whereof we have hereunto set our hands.

FRED. DUBERO.
    PETER MOHRDIECK.

Witnesses:
 S. H. NOURSE,
 H. F. ASCHECK.